(12) United States Patent
Edmonds, Jr.

(10) Patent No.: US 7,150,332 B2
(45) Date of Patent: Dec. 19, 2006

(54) SPEED CONTROLLER FOR A VEHICLE

(76) Inventor: Richard F. Edmonds, Jr., 104 Indian Ridge La., Telford, PA (US) 18969

( * ) Notice: Subject to any disclaimer, the term of this patent is extended or adjusted under 35 U.S.C. 154(b) by 245 days.

(21) Appl. No.: 10/775,116

(22) Filed: Feb. 11, 2004

(65) Prior Publication Data

US 2005/0173174 A1    Aug. 11, 2005

(51) Int. Cl.
*B62M 23/02*    (2006.01)
(52) U.S. Cl. .................. 180/65.1; 180/315; 280/212; 280/215
(58) Field of Classification Search ............... 180/205, 180/206, 207, 65.1, 315, 65.5, 335, 402, 180/65.3; 280/212, 214, 215
See application file for complete search history.

(56) References Cited

U.S. PATENT DOCUMENTS

| | | | |
|---|---|---|---|
| 4,085,814 A | | 4/1978 | Davidson et al. ............. 180/33 |
| 4,122,907 A | * | 10/1978 | Davidson et al. ........... 180/206 |
| 4,325,448 A | | 4/1982 | Pivar ........................ 180/215 |
| 4,523,769 A | * | 6/1985 | Glaser et al. ............... 280/252 |
| 4,942,936 A | * | 7/1990 | Gardner, Jr. ................ 180/207 |
| 5,671,821 A | * | 9/1997 | McGreen .................... 180/220 |
| 5,853,062 A | * | 12/1998 | Hulett ........................ 180/206 |
| 6,125,959 A | * | 10/2000 | Seto et al. .................. 180/207 |
| 6,257,610 B1 | * | 7/2001 | Plant ........................ 280/304.1 |
| 6,286,616 B1 | * | 9/2001 | Kutter ........................ 180/205 |
| 6,412,800 B1 | | 7/2002 | Tommei ..................... 280/220 |
| 6,545,437 B1 | | 4/2003 | Strothmann ................ 318/139 |
| 6,840,346 B1 | * | 1/2005 | Sugitani et al. ............ 180/402 |
| 6,883,632 B1 | * | 4/2005 | McHardy et al. .......... 180/315 |
| 2005/0001403 A1 | * | 1/2005 | Tahara ........................ 280/215 |

* cited by examiner

*Primary Examiner*—Anne Marie Boehler
(74) *Attorney, Agent, or Firm*—Gregory J. Gore

(57) ABSTRACT

A kinematic speed controller for a vehicle requires the constant deliberate movement of a rotary apparatus which is physically independent from the vehicle drive system. It does not require substantial operator muscle power since there is no direct mechanical connection between the kinematic controller and the vehicle drive system. The rotary apparatus which controls the vehicle speed may be a foot pedal and crank assembly. Additionally, the invention may include a variable degree of resistance to the rotary input device to enhance operator control or to provide muscle exercise for the operator if desired. Furthermore, the invention may include the variable setting of the relationship between the speed of the rotary input device and the amount of power provided to drive the vehicle and hence the speed of the vehicle. The components of the invention may be arranged to visually simulate a bicycle-type mechanical chain drive. The speed controller is preferably connected to an electrical generator which through appropriate circuitry controls the amount of power delivered to a drive motor from batteries. A simple electrical key switch may be utilized to completely disable the operation of the vehicle.

9 Claims, 5 Drawing Sheets

SPEED CONTROLLER FOR A VEHICLE

FIELD OF THE INVENTION

This invention relates to a speed controller for a powered vehicle. More specifically, it relates to a rotary speed control for a vehicle simulative of a bicycle-type sprocket and chain drive.

BACKGROUND OF THE INVENTION AND PRIOR ART

There are many different types of speed controllers for powered vehicles which are usually either hand levers or foot pedals such as an automobile accelerator pedal. These devices provide a fixed position of the lever or pedal which corresponds to an amount of power delivered to propel the vehicle. Some are mechanically independent, so-called "drive-by-wire" devices. However, these types of speed controllers or throttles can jam or stick in a fixed position, continuing the delivery of power when it is not wanted. This can cause serious safety problems and injury to the driver. Kinematic type drives which require the constant activity of the operator such as a pedal and crank arrangement commonly found on power-assisted bicycles also require substantial muscle power of the operator to drive the vehicle which may not be desirable or possible for drivers with physical limitations.

Examples of power-assisted vehicles with auxiliary power controlled by pedal movement are shown for example in U.S. Pat. No. 6,545,437 issued to Strothmann, U.S. Pat. No. 6,412,800 issued to Tommei, and U.S. Pat. No. 4,085,814 issued to Davidson et al. In all instances, however, the pedal crank mechanism is positively linked to the drive wheel by a chain and sprockets, and it is not possible to turn the pedals and crank mechanism forward without substantial muscular effort required to propel the vehicle. Muscle-powered drives are also known to be power-assisted, and may be varied according to the amount of muscle power input or speed of the vehicle, however these mechanical drives require the structural alignment and proximity between the pedal crank and the drive wheels in the case of a land vehicle such as a bicycle or tricycle. In cases where the motor is controlled by movement of the pedal, some torque transfer to the mechanical connection to the drive wheel is required. Since these vehicles can always be muscle-powered, there is no way to electrically disable them to limit their use as may be desired for a child's toy vehicle or to prevent unauthorized use.

Also, it may be desirable in some situations as in the case of an impaired driver or elderly operator with physical limitations to not require substantial muscle power to drive the vehicle. Also, in the case of elderly operators of stable vehicles such as three-wheeled and four-wheeled pedal-operated type vehicles it may be desirable to provide the appearance that the vehicle is being powered by the muscle power of the operator so as to obscure the physical impairment or disability of the elderly operator. This would provide the appearance of health and vitality of the operator to onlookers.

There is therefore a need in the art for a safe speed regulator for a vehicle which requires the constant kinematic activity on the part of the operator that does not require substantial muscle power to drive the vehicle or require any mechanical connection between the kinematic speed controller and the power which drives the vehicle. There is a further need in the art for such a remote kinematic speed controller which includes mechanical components simulative of a bicycle drive to provide the false appearance of the operator providing muscle power to propel the vehicle.

SUMMARY OF THE INVENTION

In order to solve the problems in the art described above, the applicant has devised a unique kinematic speed controller for a vehicle which requires the constant deliberate movement of a rotary apparatus such as a foot pedal and crank assembly physically independent from a vehicle drive system, therefore not requiring substantial operator muscle power or mechanical connection to the vehicle drive system. Additionally, the invention may include the option of providing a variable degree of resistance to the kinematic input device to enhance operator control or to provide muscle exercise for the operator. Furthermore, the invention may optionally include the variable setting of the relationship between the speed of the kinematic input device and the amount of power provided to drive the vehicle.

More specifically, the applicant has invented a vehicle speed control comprising a rotary input device capable of continuous rotary motion for human operation which is mounted to the vehicle. Sensing means is provided for responding to changes in the angular velocity of the rotary input device which is connected to a controller for regulating the amount of power provided to propel the vehicle. The vehicle further includes a remote power output for propelling the vehicle which is mechanically independent of the rotary input device. The controller is electrically connected to the rotary input device, the sensing means, a vehicle-carried power source, and the remote power output means and is operative to increase the power from the power source to the motive power output means as the sensed speed of the rotary input device increases. The rotary input device includes operator foot pedals or handles connected to a crank which the operator rotates with his or her feet or hands as the case may be. The vehicle speed controller is suitable for use on a wheeled land vehicle where the motive power output means is an electric motor which drives one or more of the vehicle wheels. The rotary input speed sensing means may be an electric generator which includes a variable resistor across its output to provide variable amounts of mechanical resistance. The power source of the vehicle is preferably a battery which includes a circuit breaker to disconnect it from the controller. The controller may also include means for selectively varying the proportionate amount of electrical power increase to the drive motor relative to increases in the sensed speed of the rotary input device. A key switch may be included to disable the controller to prevent unauthorized use of the vehicle. In one embodiment of the invention, the rotary input device further includes a drive and idler sprocket assembly with a drive chain extending between the sprockets to visually simulate a bicycle-type chain drive.

Thus, the invention provides all of the desired advantages and improvements over the prior art mentioned above. Other objects and advantages of the invention will be apparent to those of skill in the art from the following drawings and description of the preferred embodiment.

DESCRIPTION OF THE PREFERRED EMBODIMENT

Figure 1:
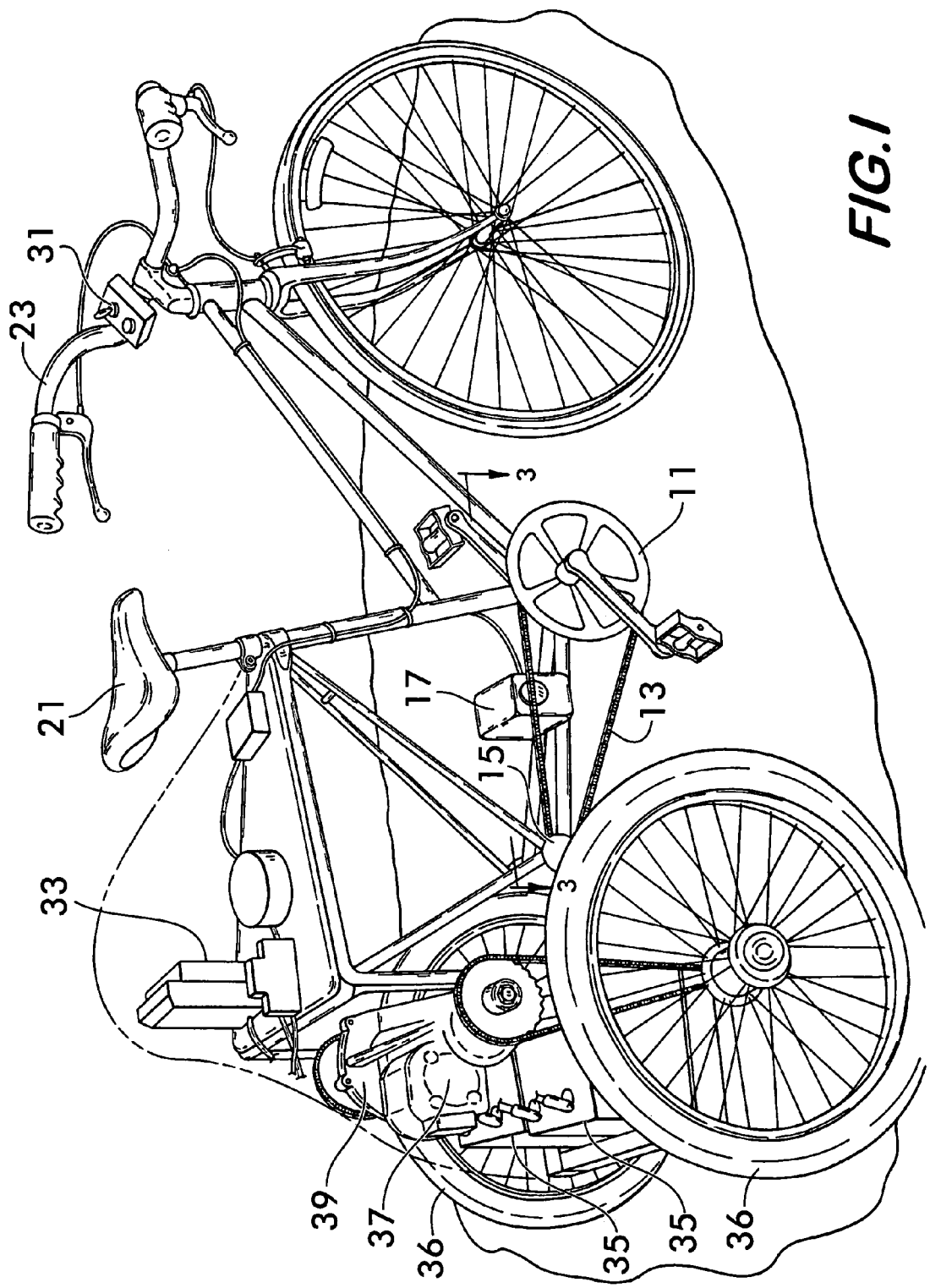
FIG. 1 is an above left side isometric view of one embodiment of the invention.

Referring now to FIG. 1, one embodiment of the invention may be employed as a three-wheeled tricycle. A bicycle-type crank and pedal assembly 11 is included in this embodiment which pulls chain 13 that is connected to an idler sprocket 15. The top run of the chain drives a generator 17, the electrical output of which increases as the speed of the crank and pedal assembly increases. This assembly together with the seat 21 and handle bar assembly 23 complete a configuration of a three-wheeled vehicle which is simulative of a pedaled tricycle. The present invention, however, is purely motor driven with the crank and pedal drive means being mechanically independent of the motor drive.

The electrical circuitry of the drive means will be described in more detail with regard to FIGS. 4 and 5, but generally includes the following major components shown in this figure, namely on/off switch means 31, generator 17 which is responsive to the speed of the crank assembly having an electrical output which is connected to a controller 33, batteries 35, and a drive motor 37. The drive motor is connected through a lateral shaft and sprocket assembly 39 which drives the rear wheels 36 of the tricycle vehicle shown in this embodiment.

Figure 2:
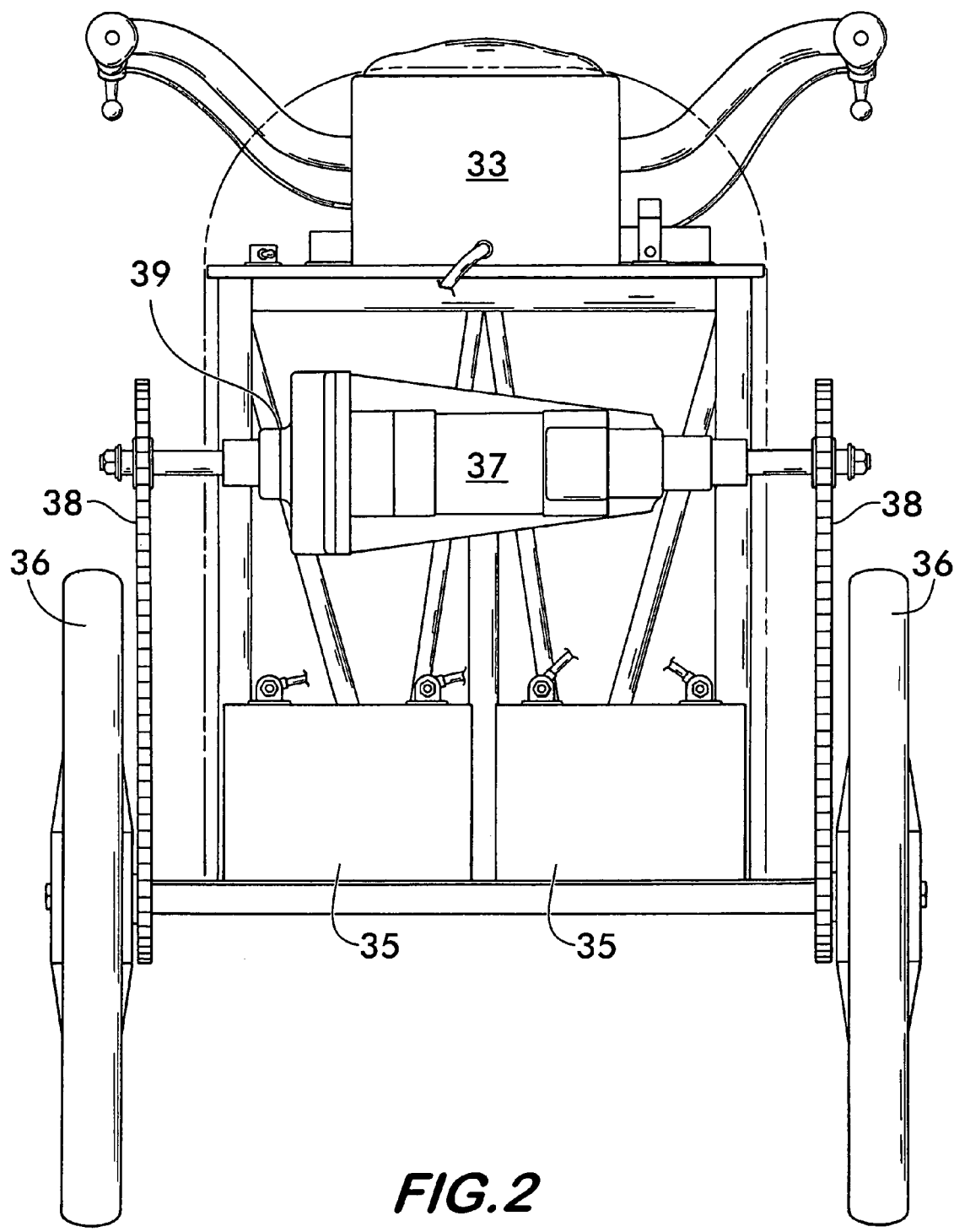
FIG. 2 is a rear view thereof.

Referring now to FIG. 2, greater detail of the drive mechanism is shown. As previously described, batteries 35 provide the electrical power to the motor 37 and lateral drive shaft assembly 39 that includes a differential drive. The drive assembly extends laterally to substantially identical sprocket and chain drive means 38 on either side of the vehicle which powers rear wheels 36 separately. The controller is operable to regulate the amount of power from the batteries 35 to propulsion motor 37 by driver circuitry. An electrical diagram of the drive system is shown in FIG. 5. The specific mechanical drive means shown in the preferred embodiment is intended to be exemplary only. There may be many other types of drives that can be used for propelling the vehicle without departing from the scope of the invention.

Figure 3:
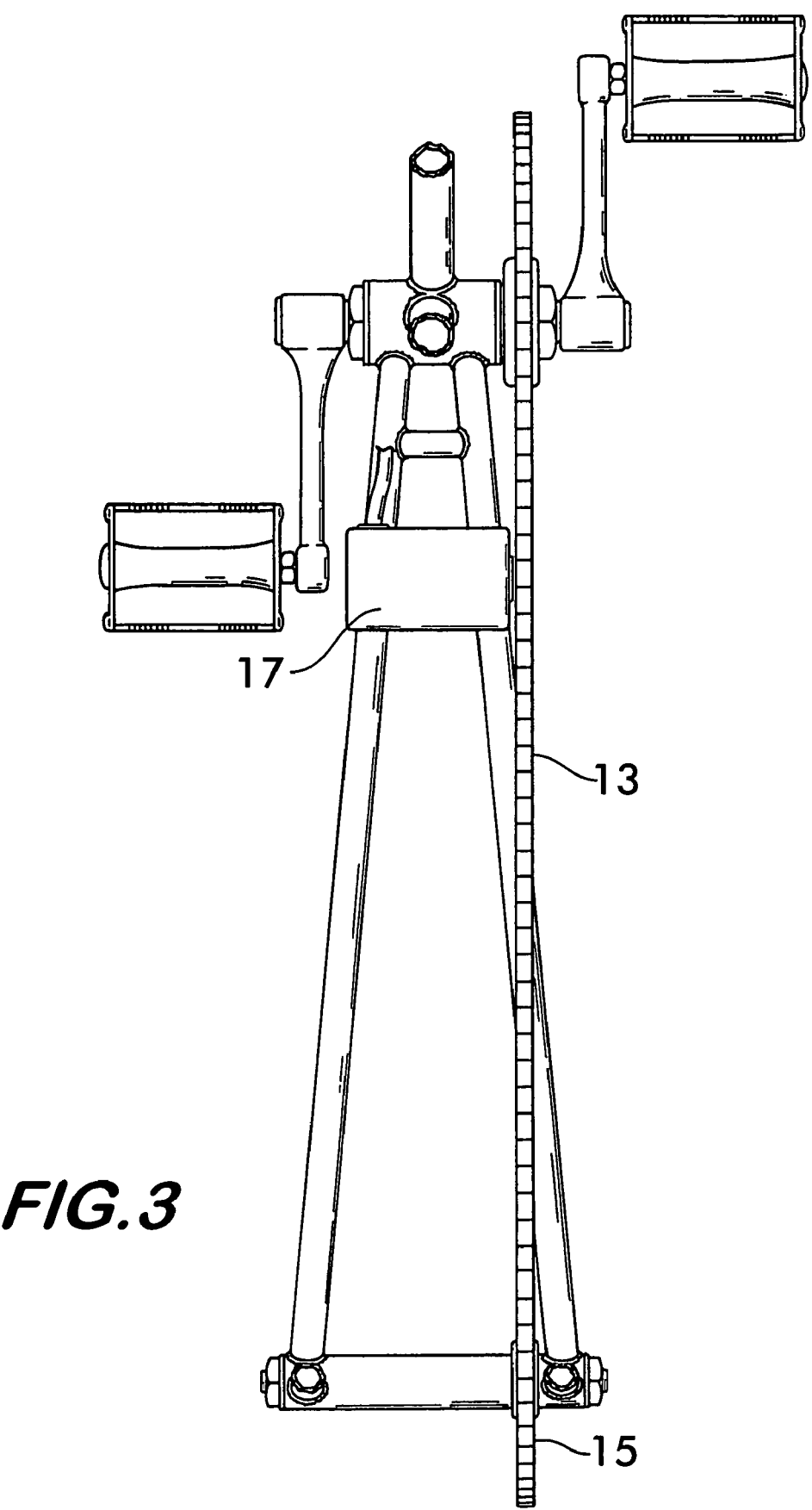
FIG. 3 is a plan sectional view taken from FIG. 1 as shown in that figure.

Referring now to FIG. 3, greater detail of the passive crank and chain drive assembly are shown. This mechanical arrangement is not only provided to regulate the speed of the vehicle by driving the generator 17, but also to simulate a bicycle-type chain drive in appearance. The drive chain 13 extends to a free-wheeling idler sprocket 15 which serves no other purpose than to support the drive chain. This mechanical configuration provides the operator with the appearance to onlookers that the vehicle is being pedal-driven when indeed it is motorized.

Figure 4:
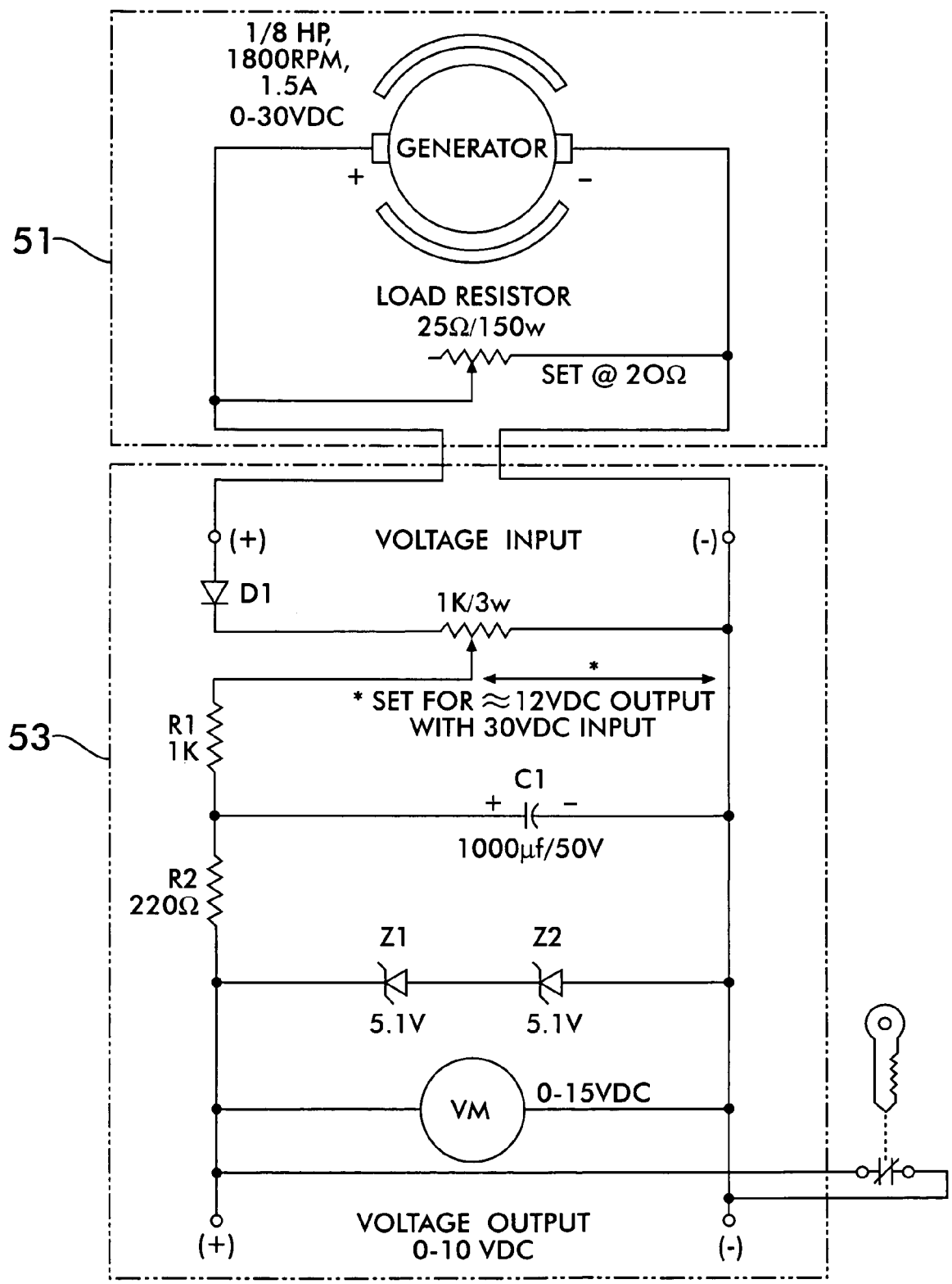
FIG. 4 is an electrical circuit diagram of the speed controller.

Referring now to FIG. 4, a circuit diagram of the speed controller portion of the invention is shown. This diagram distinguishes the sensing means 51 for detecting the angular velocity of the rotary input device, i.e. the pedal and crank assembly, and the electrical circuitry 53 which comprises the controller. The controller circuitry 53 receives its input from the output of the generator and load resistor. The rest of the electrical system including the battery and drive motor is shown in FIG. 5. In the preferred embodiment, the sensing means for detecting the angular velocity of the rotary input device is a ⅛ horsepower DC generator. Further included is a variable load resistor for providing forceable mechanical resistance to the generator. This makes the foot-operated pedal motion of the crank and pedal assembly easier to control and, because the load resistor is variable, provides for the application of an additional load if the operator wishes to obtain additional muscular exercise from operating the vehicle. The controller further includes a settable, variable resistor which in the preferred embodiment is set for approximately a 12 volt DC output with a 30 volt DC input. This variable resistor may be set to provide a variable output so that the relationship between the speed of the crank and pedal assembly relative to the motive power for driving the vehicle, and hence its speed, may be varied. This may be useful for example in setting the maximum speed of the vehicle. A key switch is also preferably added across the output of the speed controller circuitry. In the preferred embodiment, a normally closed set of contacts short out the generator signal in the "off position," assuring that the driver will not receive a reference speed signal. When the key is turned, the circuit is opened and the signals from the controller will be received as further depicted in FIG. 5. It should be understood that the sensing means for detecting the angular velocity of the pedal assembly may be replaced by means for detecting the angular position of the crank shaft, such as a rotary encoder. The use of an encoder is connected through appropriate control circuitry to an encoder on the motor so that the motor shaft is driven in proportion to the rotation of the crank assembly by regulating the relative positions of the shafts.

Figure 5:
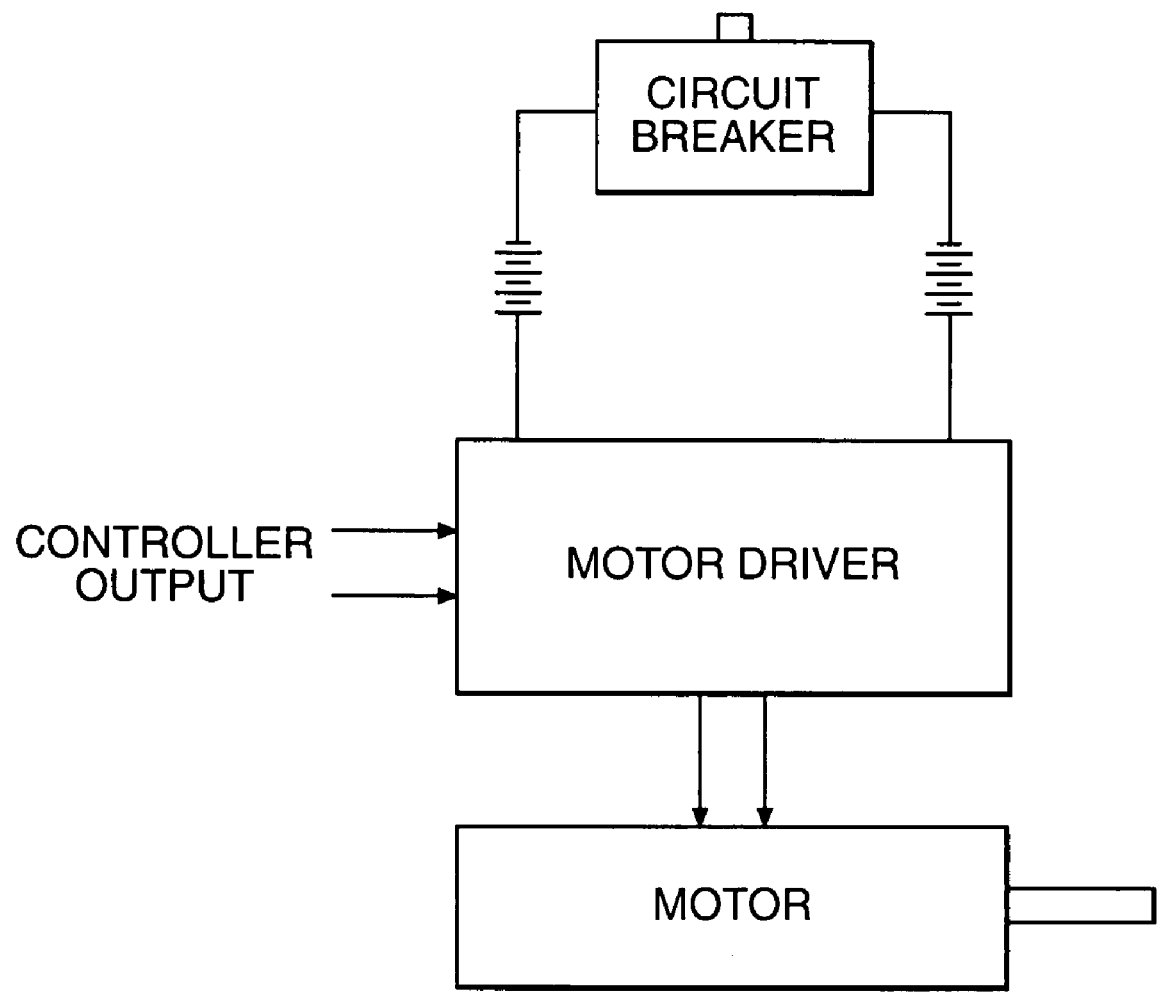
FIG. 5 is an electrical circuit diagram of the power and propulsion system.

Referring now to FIG. 5, the speed controller output is connected to a variable speed motor driver circuit well-known in the art which delivers power to the propulsion motor of the vehicle. Depending upon the speed of a rotary input device, the controller will output between 0–10 VDC. Proportional thereto, the motor driver will increase the speed of the propulsion motor. In the preferred embodiment, the motor driver receives its power from a pair of batteries which may be disconnected from the circuit by a circuit breaker. It will be understood by those of skill in the art from the controller circuitry shown in FIG. 4 that as the voltage input increases, power to the drive motor would likewise increase. Accordingly, as the speed of the crank and pedal assembly increases, the vehicle will be propelled faster, or conversely, more slowly as the pedal speed decreases.

While the preferred embodiment shows the invention in the form of a tricycle-type pedaled vehicle, it should be understood that it may take many other forms to control the speed of a vehicle. For example, while a foot pedal and crank assembly is shown as the means for providing the rotary input, this crank assembly may also be in the form of a crank assembly with handles rather than foot pedals so that the device may be hand operated rather than foot operated. Furthermore, while the vehicle may be a land, sea, or air vehicle, in all cases the main object of the invention is the use of rotary kinetic motion to control vehicular speed. The invention may be in the form of a rotary hand crank on an industrial forklift truck providing the benefits of both safety and greater operator control of the vehicle. As described in the preferred embodiment, providing the controller with a simple on/off switch type circuit breaker may be used to disable vehicles, and/or may be key-activated to prevent unauthorized use or prevent use by children if unattended. Other modifications include the use of other devices well-known to electric vehicles such as regenerative braking. There may be yet other modifications which will be apparent to those of skill in the art without departing from the spirit and scope of the invention which should be determined solely by the following claims and their legal equivalents.

What is claimed is:

1. A vehicle speed controller, comprising:

a rotary input device for human operation capable of continuous rotary motion mounted to a vehicle being mechanically independent of means for propelling said vehicle;

speed sensing means responsive to changes in the angular velocity of said rotary input device;

a power source carried by said vehicle;

a motor connected to said means for propelling said vehicle, said motor being mechanically independent of said rotary input device;

a controller electrically connected to said speed sensing means, said power source, and said motor, said controller being operative to proportionally regulate power supplied from said power source to said motor only relative to the sensed speed of said rotary input device in a continuous range from zero power when said rotary input device is halted;

wherein said vehicle is a wheeled land vehicle and said motor is an electric motor which mechanically drives one or more vehicle wheels and further wherein said speed sensing means is an electric generator mechanically driven by said rotary input means operative to selectively provide mechanical resistance to the rotation of said rotary input device by electrical resistance means; and said electrical resistance means being connected to the electrical output of said generator.

2. The speed controller of claim 1 further described in that said electric resistance means is manually settable to provide variable amounts of mechanical resistance.

3. The speed controller of claim 1 wherein said power source is a battery.

4. The speed controller of claim 3 further including a circuit breaker to disconnect said power source.

5. The speed controller of claim 1 further including means for selectively varying the proportional amount of electrical power increase to said motor relative to the increase in the sensed speed of the rotary input device.

6. A vehicle speed controller, comprising:

a rotary input device for human operation capable of continuous rotary motion mounted to a vehicle being mechanically independent of means for propelling said vehicle;

speed sensing means responsive to changes in the angular velocity of said rotary input device;

a power source carried by said vehicle;

a motor connected to said means for propelling said vehicle, said motor being mechanically independent of said rotary input device;

a controller electrically connected to said speed sensing means, said power source, and said motor, said controller being operative to proportionally regulate power supplied from said power source to said motor only relative to the sensed speed of said rotary input device in a continuous range from zero power when said rotary input device is halted; and wherein said rotary input device further includes a drive sprocket, idler sprocket, and a drive chain extending therebetween, said sprockets and chain being visually simulative of a bicycle chain drive.

7. The vehicle speed controller of claim 6 further including a key switch which in the off position shorts out the output of the speed controller to disable it.

8. The speed controller of claim 6 wherein said speed sensing means is a first rotary encoder.

9. The vehicle speed controller of claim 8 further including a second encoder connected to said motor output means for determining its angular position of rotation.

* * * * *